(12) United States Patent
Rafidi et al.

(10) Patent No.: US 11,439,947 B2
(45) Date of Patent: Sep. 13, 2022

(54) SYSTEM AND METHOD FOR MIXING RECIRCULATING COMBUSTION ASH WITH HYDRATED LIME AND WATER

(71) Applicant: ANDRITZ AKTIEBOLAG, Ornskoldsvik (SE)

(72) Inventors: Nabil Rafidi, Vaxjo (SE); Ali Mustapha Tabikh, Vaxjo (SE); Robert Rahlin, Vaxjo (SE); Wuyin Wang, S Sandby (SE); Bjorn Sture Rikard Hakansson, Vaxjo (SE)

(73) Assignee: ANDRITZ AKTIEBOLAG, Ornskoldsvik (SE)

( * ) Notice: Subject to any disclaimer, the term of this patent is extended or adjusted under 35 U.S.C. 154(b) by 179 days.

(21) Appl. No.: 17/006,078

(22) Filed: Aug. 28, 2020

(65) Prior Publication Data
US 2022/0062814 A1 Mar. 3, 2022

(51) Int. Cl.
*B01D 53/14* (2006.01)
*B01D 53/50* (2006.01)
(Continued)

(52) U.S. Cl.
CPC ......... *B01D 53/1481* (2013.01); *B01D 53/18* (2013.01); *B01D 53/502* (2013.01);
(Continued)

(58) Field of Classification Search
CPC ........ B01D 53/14; B01D 53/50; B01D 53/18; B01D 53/80; B01F 7/00; B01F 7/16;
(Continued)

(56) References Cited

U.S. PATENT DOCUMENTS

| 307,834 A | 11/1884 | Black |
| 735,206 A | 8/1903 | Burrows |

(Continued)

FOREIGN PATENT DOCUMENTS

| CN | 202823219 | 3/2013 | |
| CN | 105 413 521 A * | 3/2016 | ................ B01F 7/16 |

(Continued)

OTHER PUBLICATIONS

International Search Report issued in corresponding PCT Application No. PCT/US2021/071280 dated Dec. 1, 2021.

*Primary Examiner* — Timothy C Vanoy
(74) *Attorney, Agent, or Firm* — Grogan, Tucillo & Vanderleeden, LLP

(57) ABSTRACT

A mixer for recirculating ash from solid fuel combustion with hydrated lime and water and to feed the mixture into a desulfurization reactor. The mixer includes a housing having a front wall, two outer vertical sidewalls, a rear wall, a top, and a bottom, the top includes a feed chute configured for the entry and addition of product to the mixer, and the front wall includes an opening for the mixture of product to exit. The mixer also includes a rotatable vertical shaft having an impeller, the impeller having a plurality of blades disposed on the vertical shaft in the same horizontal plane and distributed equidistantly about the circumference of the vertical shaft. The mixer also includes a vertical wall disposed within the housing forming a mixing region and a feeding region that is operably connected to the opening of the front wall.

21 Claims, 7 Drawing Sheets

(51) Int. Cl.
    *B01D 53/18*     (2006.01)
    *B01D 53/80*     (2006.01)
    *B01F 7/00*     (2006.01)
    *B01F 7/16*     (2006.01)
    *B01F 7/18*     (2006.01)
    *B01F 15/00*     (2006.01)
    *B01F 13/02*     (2006.01)
    *F23J 15/04*     (2006.01)
    *B01F 27/1125*     (2022.01)
    *B01F 33/40*     (2022.01)
    *B01F 27/191*     (2022.01)
    *B01F 27/85*     (2022.01)
    *B01F 27/84*     (2022.01)
    *B01F 27/90*     (2022.01)
    *B01F 35/00*     (2022.01)

(52) U.S. Cl.
    CPC .......... *B01D 53/80* (2013.01); *B01F 27/1125* (2022.01); *B01F 27/191* (2022.01); *B01F 27/84* (2022.01); *B01F 27/85* (2022.01); *B01F 27/90* (2022.01); *B01F 33/406* (2022.01); *B01F 35/55* (2022.01); *F23J 15/04* (2013.01); *B01D 2251/404* (2013.01); *B01D 2257/30* (2013.01); *F23J 2700/001* (2013.01); *F23J 2900/01005* (2013.01)

(58) Field of Classification Search
    CPC .. B01F 7/18; B01F 15/00; B01F 13/02; B01F 23/023; B01F 23/09; B01F 23/30; B01F 23/50; B01F 23/51; B01F 23/511; B01F 23/53; B01F 23/54; B01F 23/56; B01F 23/566; B01F 25/00; B01F 25/10; B01F 25/83; B01F 25/84; B01F 2025/93; B01F 27/05; B01F 27/113; B01F 27/86; B01F 27/87; F23J 15/04
    See application file for complete search history.

(56) References Cited

U.S. PATENT DOCUMENTS

| | | | |
|---|---|---|---|
| 3,806,452 A * | 4/1974 | Walker | ................. B01F 23/233 210/219 |
| 5,887,973 A | 3/1999 | Ahman et al. | |
| 6,213,629 B1 | 4/2001 | Bringfors | |
| 2008/0037361 A1 | 2/2008 | Fleishman et al. | |
| 2013/0279286 A1 | 10/2013 | White et al. | |
| 2014/0014139 A1 | 1/2014 | Landmer | |

FOREIGN PATENT DOCUMENTS

| | | | | |
|---|---|---|---|---|
| CN | 106039962 A | | 10/2016 | |
| CN | 207877259 U | | 9/2018 | |
| CN | 208362032 U | | 1/2019 | |
| EP | 0031395 | | 7/1981 | |
| EP | 0 671 203 A1 | * | 9/1995 | ............... B01F 1/00 |
| EP | 3269692 A1 | | 1/2018 | |
| KR | 10 2018 0027487 | * | 3/2018 | ............... C02F 1/24 |
| WO | 2008008568 | | 1/2008 | |

* cited by examiner

SYSTEM AND METHOD FOR MIXING RECIRCULATING COMBUSTION ASH WITH HYDRATED LIME AND WATER

TECHNICAL FIELD

Embodiments, as described herein, relate generally to systems and methods for mixing particulate material and liquid, and particularly for mixing water and absorbent material which is reactive with gaseous pollutants in flue gases and which, during the cleaning of flue gases, is to be introduced into these gases in a moistened state in order to convert the gaseous pollutants into separable dust.

BACKGROUND

A boiler typically includes a furnace in which fuel is burned to generate heat to produce steam. The combustion of the fuel creates thermal energy or heat, which is used to heat and vaporize a liquid, such as water, which makes steam. The generated steam may be used to drive a turbine to generate electricity or to provide heat for other purposes. Typically, fossil fuels, such as pulverized coal, natural gas, and the like are used in many boiler combustion systems. When combusting fuel to generate heat, however, soot and flue gases containing pollutants are formed.

When gaseous pollutants, such as sulfur dioxide, are to be separated from flue gases, the gases are conducted through a contact reactor in which particulate absorbent material reactive with the gaseous pollutants is introduced in a moistened state into the flue gases to convert the gaseous pollutants to separable dust. The flue gases are then conducted through a dust separator, in which dust is separated from the flue gases and from which the thus-cleaned flue gases are drawn off. Part of the separated dust is directed to a mixer, where it is mixed and moistened with water, whereupon it is recycled as absorbent material by being introduced into the flue gases along with an addition of fresh absorbent. Slaked lime (calcium hydroxide) is generally used as a fresh absorbent.

One type of existing mixer has a mixer container having a rear end in which an inlet is located, and a front end in which an outlet is located. When used as a mixing device in which the above-described mixing of absorbent material and water is performed, the front end of the container is inserted in a flue-gas channel through which the flue gases containing the gaseous pollutants are conducted. The outlet, which is also disposed in the flue-gas channel, is an overflow means formed by widthwise sidewalls in the part of the container inserted in the channel being lower than in the container part located outside the channel. However, projection of the container into the flue-gas channel may cause a disturbance of the gas flow therein and make it difficult to obtain an even distribution of moistened material across the channel cross-section, particularly in the case of large cross-sectional areas.

Another legacy mixer employs an elongate mixer container having two widthwise side walls and being arranged essentially horizontally in its lengthwise extension, an inlet for the introduction of particulate material into the container, liquid spraying means for spraying liquid over the particulate material in the container, an agitator in the container, the agitator including at least one rotary shaft which extends in the longitudinal direction of the container and on which are mounted, at an angle, a plurality of axially spaced-apart discs through the centers of which the shaft extends, an outlet for discharging material mixed with liquid from the container, and a fluidizing means adapted to fluidize the particular material in the container during the mixing operation. While this mixer may be effective for its intended purpose, it can be large in width and requires specific configuration to ensure even distribution of materials. In particular, a horizontal shaft mixer with rotating discs or paddles has very limited mixing performance in the direction parallel to the width of the mixer. As a result, the incoming recirculating product or the reagent typically has to be fed uniformly along the width of the mixer. Consequently, in general, the width of these feeders has to be equivalent to the width of the mixer making them relatively large.

Moreover, there have always been challenges with current mixer configurations to increase water to product ratios. For example, the maximum water content, e.g., 0-3% depending on the fuel type and the properties of the recirculating products, is limited to avoid agglomeration, pelletizing, clogging and build-ups in the mixer. These difficulties appear due to either the physical or the chemical properties of the dust. Some types of dust agglomerate spontaneously when water is added because of the cohesive nature of the particle surfaces. When materials are cohesive and agglomerate, convective mixing is no longer enough to obtain a randomly ordered mixture. The relative strong inter-particle forces form lumps, which are not broken up by the mild transportation forces in the convective mixer. In addition, rapid agglomeration and pellet formation can be influenced by the chemical composition of the dust, for example, dust containing calcium chlorides. This can result in anything between small soft aggregates that break easily, to hard lumps (pellets) of variable size. As a result, it has become a design requirement that water nozzles be distributed along the mixer to ensure the most even distribution of added water without agglomeration.

It would be desirable to have a mixer that provides improved mixing of fly ash, hydrated lime, and water and ensures uniform and homogeneous feed of the mixing products into a reactor duct without some of the constraints of known mixer configurations.

BRIEF DESCRIPTION

In an embodiment, described herein is a method for mixing recirculating ash from solid fuel combustion with hydrated lime and water and to feed the mixture into a desulfurization reactor. The method including directing the recirculating ash, the hydrated lime and the water to a mixer having housing via a feed chute, the housing having a front wall, two outer vertical sidewalls, a rear wall, a top and a bottom, and the front wall includes an opening for mixed product to exit the mixer, rotating, at a first selected speed, in a first direction, a first rotatable vertical shaft having at least one an impeller, the at least one impeller including a first plurality of blades disposed on the first vertical shaft in the same horizontal plane, the first plurality of blades of the at least one impeller distributed about the circumference of the first vertical shaft, the blades having a shear contact with the mixture to add shear forces and avoid agglomeration and pellet formation in the mixture when exhibiting a selected moisture content, and increasing a residence time of the mixture in a mixing region formed by a vertical wall disposed within the housing, the mixing region including the one or more vertical shaft(s). The method also includes forming a feeding region within the housing with the vertical wall, the feeding region operably connected to the opening of the front wall, and providing an opening beneath the vertical wall between the vertical wall and the bottom of the mixer, fluidizing the mixture with a fluidization mechanism in at least the feeding region to increase flowability of the mixture, the fluidizing including directing gases or air into the mixture from the bottom of the housing, and directing the mixture to the opening.

In an embodiment, described herein is a mixer for recirculating ash from solid fuel combustion with hydrated lime and water and to feed the mixture into a desulfurization reactor. The mixer includes a housing having a front wall, two outer vertical sidewalls, a rear wall, a top, and a bottom, the top includes a feed chute configured for the entry and addition of product to the mixer, and the front wall includes an opening for the mixture of product to exit. The mixer also includes a rotatable vertical shaft having an impeller, the impeller having a plurality of blades disposed on the vertical shaft in the same horizontal plane, and distributed equidistantly about the circumference of the vertical shaft. The mixer also includes a vertical wall disposed within the housing forming a mixing region and a feeding region that is operably connected to the opening of the front wall and a fluidization mechanism to increase flowability of the mixture, the fluidizing including directing gases or air into the mixture from the bottom of the housing in at least the feeding region.

Also described herein in yet another embodiment is a system for treating flue gases and mixing recirculating ash from solid fuel combustion with hydrated lime and water and to feed the mixture into a desulfurization reactor. The system includes a plant system including a combustion system that combusts fuel to form flue gases and ash, a flue gas treatment system operable to provide a semi-dry flue gas desulphurization of heated acid-rich flue gases, the flue gas treatment system including, a reactor for reacting acidic flue gasses with hydrated lime under humidified conditions, and a particulate collection device operable to separate gaseous pollutants from particulate matter yielding captured dust while flue gases are directed to a stack for disposal. The system also includes a mixer for recirculating ash from solid fuel combustion with hydrated lime and water and to feed the mixture into a desulfurization reactor. The mixer includes a housing including a front wall, two outer vertical side walls, a rear wall, a top and a bottom, the top includes a feed chute configured for the entry and addition of product to the mixer, and the front wall includes an opening for mixed product to exit the mixer, one or more rotatable vertical shafts having at least one an impeller, the at least one impeller including a first plurality of blades disposed on the vertical shaft in the same horizontal plane, the first plurality of blades of the at least one impeller distributed equidistantly about the circumference of the vertical shaft, the blades having a shear contact with the mixture to add shear forces and avoid agglomeration and pellet formation in the mixture when exhibiting a selected moisture content, and a vertical wall disposed within the housing forming a mixing region with the one or more vertical shaft(s) and a feeding region that is operably connected to the opening of the front wall, the internal vertical wall operable to increase a residence time of the mixture in the mixing region and to prevent bypassing, the vertical wall including an opening, beneath the vertical wall between the vertical wall and the bottom of the mixer. The system also includes a fluidization mechanism to increase flowability of the mixture, the fluidizing including directing gases or air into the mixture from the bottom of the housing in at least the feeding region.

Additional features and advantages are realized through the techniques of the present disclosure. Other embodiments and aspects of the disclosure are described in detail herein. For a better understanding of the disclosure with the advantages and the features, refer to the description and the drawings.

DRAWINGS

The described embodiments will be better understood from reading the following description of non-limiting embodiments, with reference to the attached drawings, wherein below:

DETAILED DESCRIPTION

Figure 1:
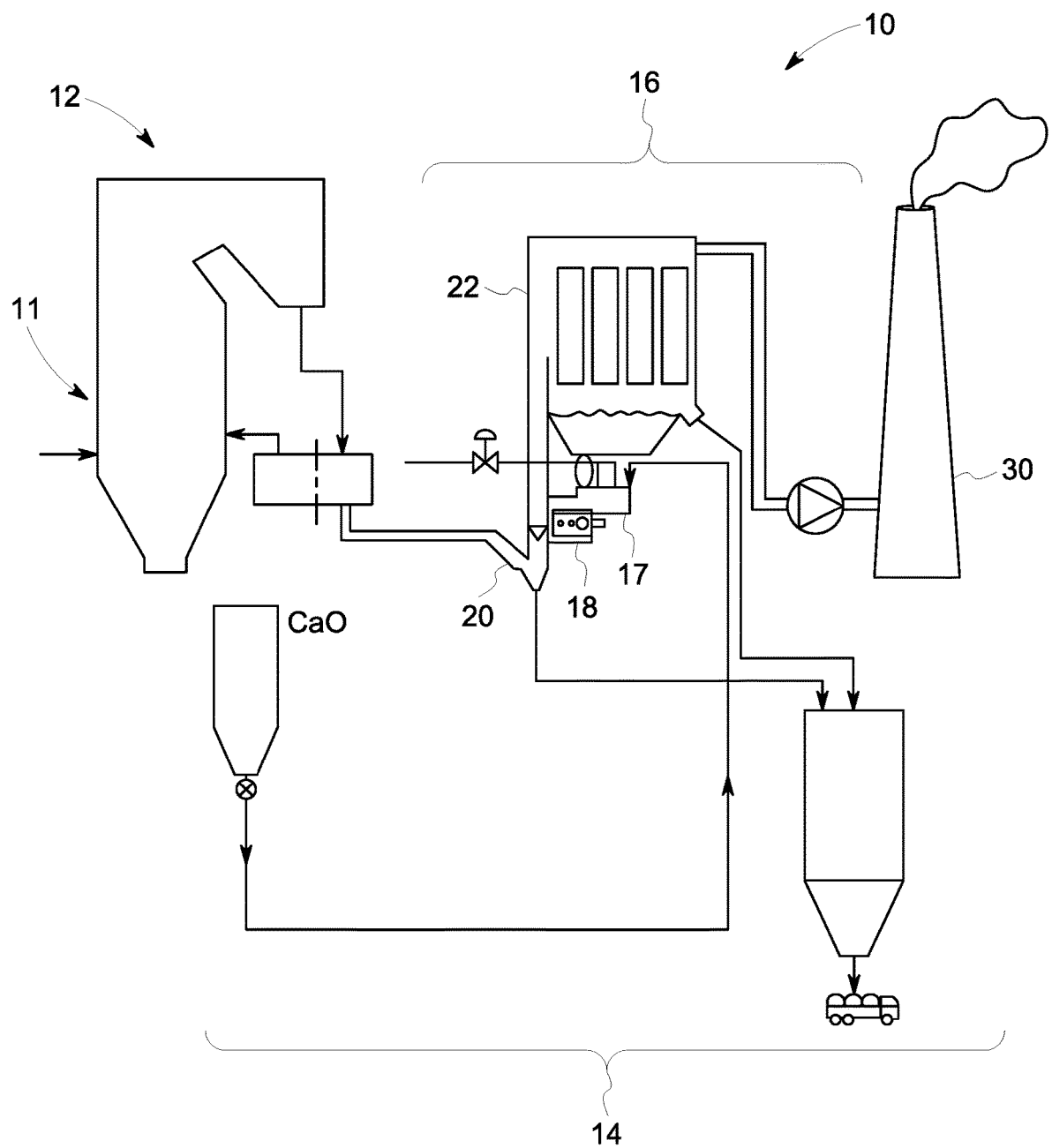
FIG. 1 is a simplified schematic illustration of a boiler system with a flue-gas treatment system in accordance with an embodiment.

Reference will be made below in detail to exemplary embodiments as described herein, examples of which are illustrated in the accompanying drawings. Wherever possible, the same reference characters used throughout the drawings refer to the same or like parts. While the various embodiments as described herein are suitable for use with steam generation systems that include a combustion system such a pulverized coal boiler that formulates flue gases, such reference is purely for illustration generally. Other systems may include other types of plants generating flue gases, including, but not limited to, chemical plants, iron, and steel plants, power generation plants, as well as boilers, furnaces and fired heaters utilizing a wide range of fuels including, but not limited to, coal, oil, and gas. For example, contemplated boilers include, but are not limited to, may both T-fired and wall fired pulverized coal boilers, circulating fluidized bed (CFB) and bubbling fluidized bed (BFB) boilers, stoker boilers, suspension burners for biomass boilers, including controlled circulation, natural circulation, and supercritical boilers and other heat recovery steam generator systems.

FIG. 1 depicts a simplified diagram of a plant system 10 including a boiler 12 having a combustion system 11 and a flue gas treatment system shown generally as 14. Embodiments, as described herein, relate to a combustion system 11 as may be employed in a boiler 12, that with the combustion fuel, generates flue gases. The flue gases are treated in the flue gas treatment system 14, more particularly, a semi-dry flue gas desulphurization system 16 employed to treat heated acid-rich flue gases. The flue gas treatment system 14 includes a hydrator 17 if needed, mixer 18, a reactor 20, and particulate collector 22 (typically a fabric filter, electrostatic precipitators can be used as well). In the reactor 20, acidic flue gasses react with lime/hydrated lime under humidified conditions. Once bound to the particulate matter, the gaseous pollutants are removed from the flue gas in a downstream particulate collector 22, where it is captured, for example, on filter bags or electrostatic grids. During the cleaning of the collector 22, the dust falls in the hopper, where it is fed back by a feeder 24 (FIG. 2) to the mixer 18 again. The collected particles are recycled to the mixer 18 where fresh hydrated lime and water are added to the process. Collected particulate matter is also separated for disposal for the particulate collector 22. Finally, cleaned flue gases are then directed to a stack 30 for disposal to the ambient.

It should be appreciated that the mixer 18 need not always be connected to hydrator 17. Generally, there are three types of reagents: i) high alkalinity fly-ash; ii) hydrated lime, already Ca(OH)2; or iii) quick lime such as CaO. In the case of a quick lime, the hydrator 17 is needed, and in this case, the hydrator 17 may be connected directly to the mixer 18. If a hydrated lime is used, which is also a powder, it can be added by a variety of techniques (e.g., a blower feeder) into the mixer 18 in the part between the feeder 50 and mixer 18, or just upstream the recirculation feeder. What is key to note is the difficulty presented to the mixer 18 based on the water and dust, i.e., increasing moisture content. As a result, in an embodiment, the mixer 18 of the recirculated product may be connected to a quick lime hydrator 17.

In addition, it is beneficial to note that the flow rate of the hydrated lime is a small percentage of the overall recirculated products in the mixer 18 (e.g., on the order of a fraction of 1% to a few percent). Of course, actual percentages employed are varied depending on the process and materials employed.

Figure 2:
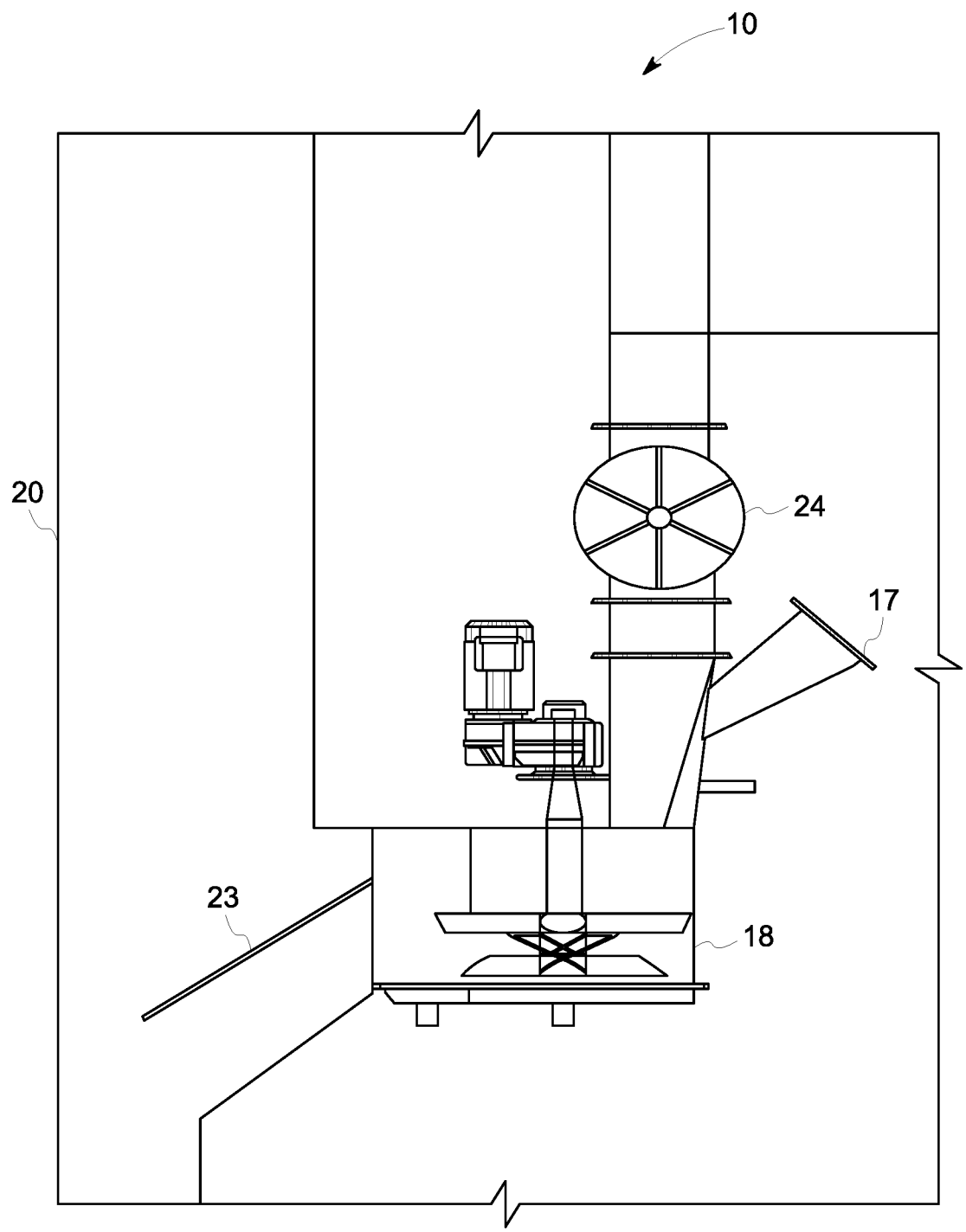
FIG. 2 is an illustration of a partial cross-section of a reactor and mixer in accordance with an embodiment.

Referring now to FIG. 2, in desulphurization applications, the mixer 18 is positioned beneath a recycle feeder 24 and between the hydrator 17 and the reactor 20. Fresh hydrated lime is introduced in the mixer 18 from the hydrator 17. The hydrated lime is mixed with the recirculated product (flue gas particulates) from the feeder 24 and water from the water lance(s) (not shown). In the mixer 18, the products are mixed until it reaches the level of the upper edge of a disperser plate 23 after which, the products flow on the disperser plate 23 into the reactor 20, where it is entrained in the flue gas. In desulphurization operations, the added water typically moisturizes the product. The added water also provides for an increase in relative humidity to improve acid gas removal and for evaporative cooling of flue gas in the reactor 20. Generally, it is important to distribute the water homogeneously in the product to avoid pelletization of the dust in the mixer 18 and to get even temperature distribution as cooling continues in the reactor 20.

In current systems, however, to avoid pelletization, the maximum water that can be added to product ratio with mixing and the hydrated lime is limited to a moisture content of e.g. 0-3% depending on the fuel type and the properties of the recirculating products. Therefore, an objective of certain described embodiments is to improve mixer performance enabling higher moisture content (e.g., on the order of 5-7%). Increased moisture content enables the desulphurization system 16 (FIG. 1) to either utilize a smaller amount of recirculation dust for the same effective flue-gas cooling, or achieve a greater temperature reduction in the flue gas via the same amount of dust. More specifically, increased moisture content facilitates reactivation of the recycled solid products and reagent for acidic gas reduction, and improves the flue gas temperature reduction capacity of the dust. Moreover, by increasing the moisture content, the dust recirculation and the pressure drop in the reactor 20 can be reduced by ~50% and ~35%, respectively.

In addition, certain embodiments ensure uniform and homogeneous product feed to the reactor 20 and avoid agglomerates formation in the dust within moderate residence times in the mixer 18. Reducing the pressure drop in the reactor 20 is directly correlated to cost savings in system 10 operation. For example, in an embodiment, a 35% pressure drop in the reactor 20 is directly translated to a $292,000 USD present value cost savings, when based on a reactor flue gas capacity of 310 kNm$^3$/h; with an electricity price 50 USD/MWh; and 8000 Hr. operating duration per annum, when assuming a 4% interest rate and 15-year life span.

Figure 3A:
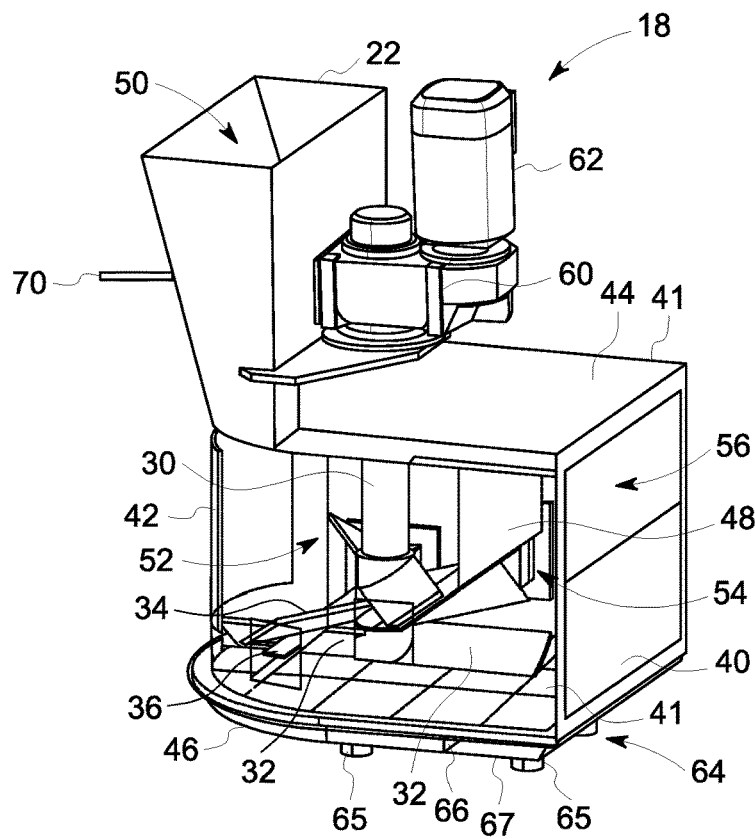
FIG. 3A is a perspective partial illustration of a mixer in accordance with an embodiment.
Figure 3B:
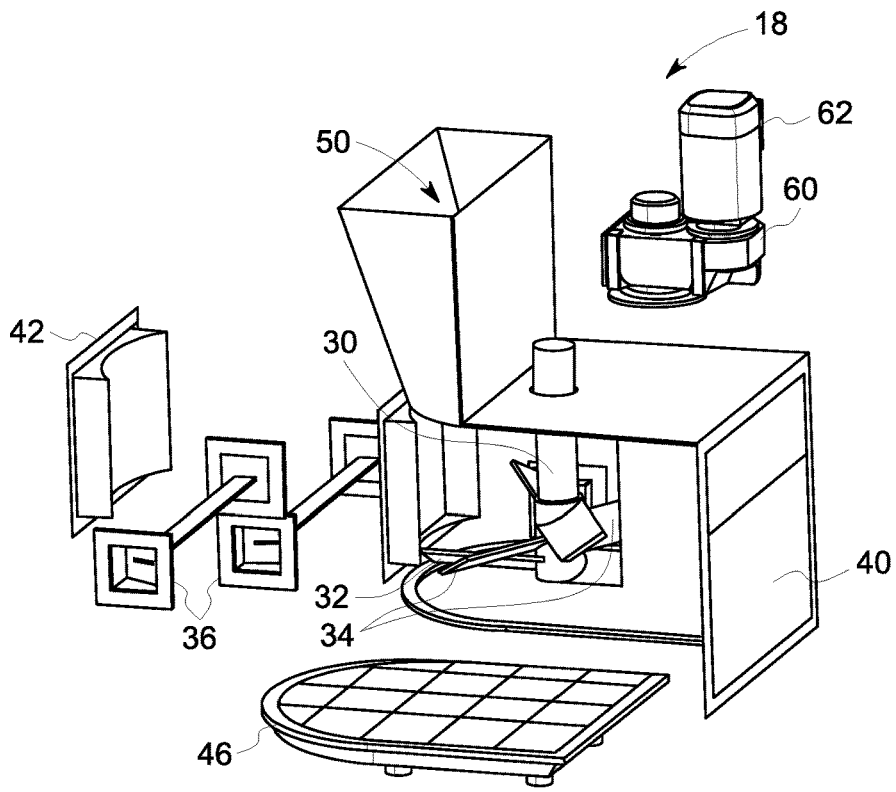
FIG. 3B is a perspective partial exploded illustration of a mixer of FIG. 3A in accordance with an embodiment.
Figure 3C:
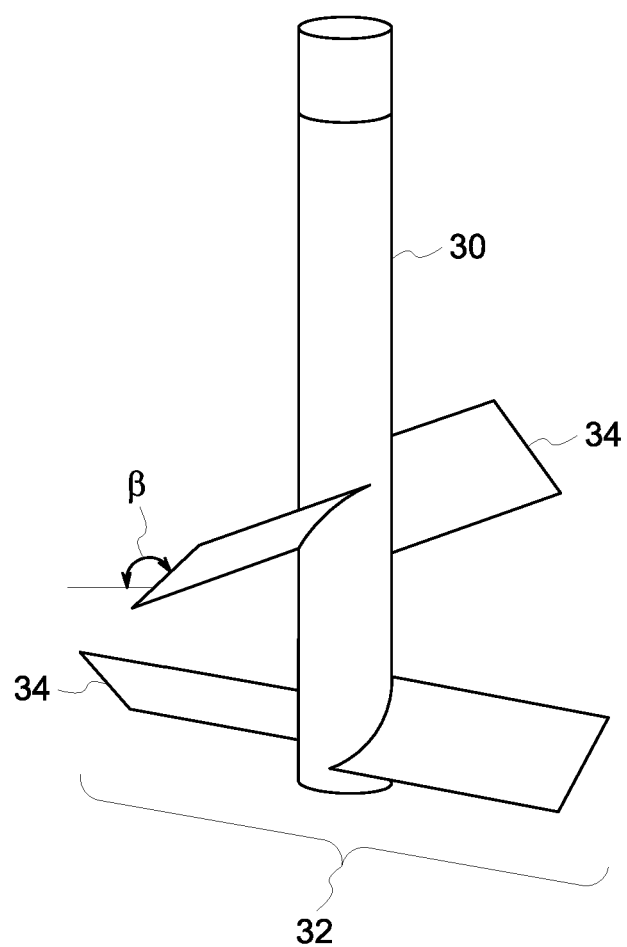
FIG. 3C is a perspective partial illustration of a mixer shaft, impellers and blades in accordance with an embodiment.
Figure 4A:
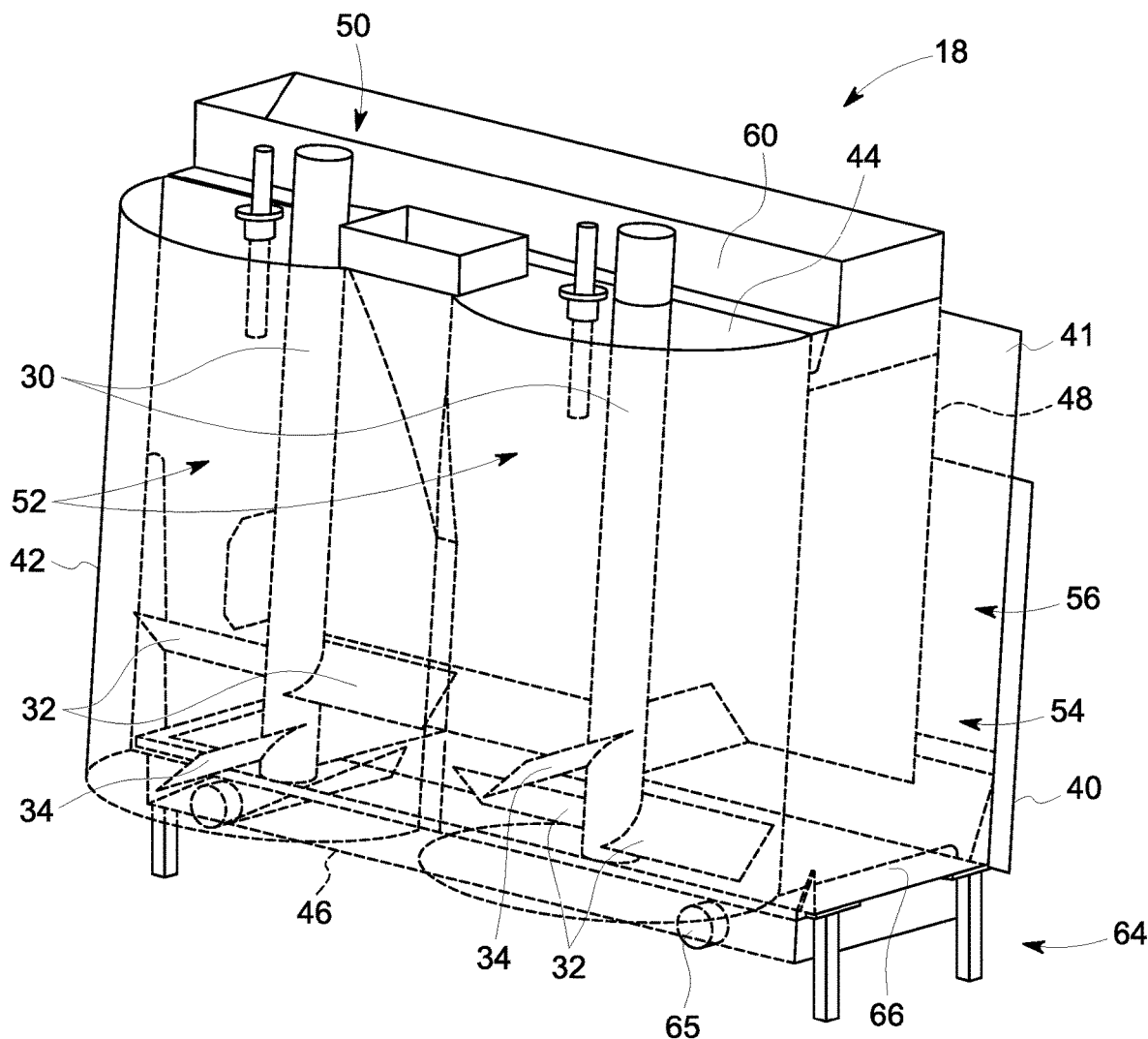
FIG. 4A is a perspective partial illustration of a mixer in accordance with an embodiment.
Figure 4B:
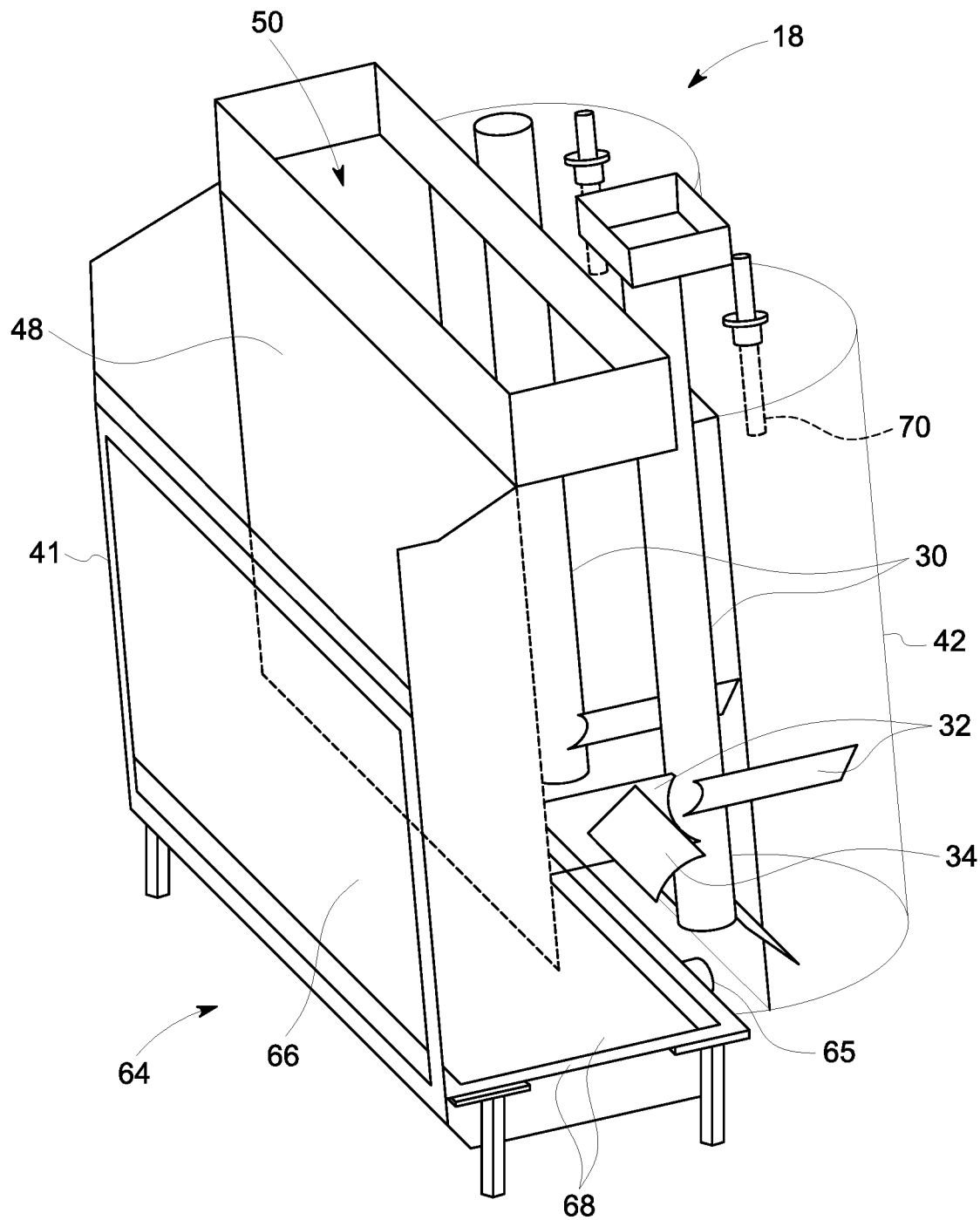
FIG. 4B is another perspective partial illustration of a mixer of FIG. 4A in accordance with an embodiment.

Turning now to FIGS. 3A-4B, these figures depict various embodiments. FIGS. 3A-3C depict perspective, partial cutaway views of a mixer 18 in accordance with an embodiment, with FIG. 3B illustrating a partially exploded view of FIG. 3A and FIG. 3C illustrating a partial view of a mixer shaft, impeller and blades. FIG. 4A depicts a perspective, partial cutaway view of a mixer 18 with two shafts in accordance with another embodiment, with FIG. 4B depicting a cut away view of a two shaft mixer 18. In certain embodiments, the mixer includes a housing, shown generally as 19, which in operation provides for improved convective mixing mechanism using one or more vertical shaft (s) 30 with a vertical impeller 32 having blades 34 configured in the same horizontal plane on the vertical shaft 30, unlike the horizontal rotating shafts in known systems.

For example, advantageously, in one configuration, a vertical-shaft mixer 18 with a single impeller 32 having two blades 34 angled 45° with the shaft 18 that is rotating at 20 rpm of an embodiment, provides favorable performance when compared to a horizontal-shaft mixer of a legacy configuration that has six pairs of paddles also angled at 45° with the shaft axis that is rotating at 40 rpm. In the legacy horizontal-shaft mixer, diffusion is the dominant mixing mechanism regardless of the impeller configurations resulting in Peclet (Pe) numbers of less than 1. Conversely, in the vertical-shaft mixer 10, of the described embodiments, convection was the dominant mixing mechanism with Peclet numbers varying between 24 and 50. The Peclet number is a measure of the relative importance of advection versus diffusion, where a large number indicates an advectively dominated distributed flow, and a small number indicates a diffuse flow. Because particle diffusivity and granular temperature in both mixers were similar, while the Peclet numbers in the vertical-shaft mixer were 2 to 3 orders of magnitudes higher than that in the horizontal-shaft mixer, the vertical-shaft mixer exhibits significantly more pronounced convective mixing than the horizontal-shaft mixer.

Referring again to FIGS. 3A-4B, approximate example geometries of a mixer 18 have one vertical shaft (3A and 3B) and two vertical shafts (4A and 4B) are depicted. The mixer 18 includes, generally, a front wall 40, two outer vertical sidewalls, 41, a rear wall 42, and a top 44 and a bottom 46. The top 44 includes a feed chute 50 for the entry and addition of product to the mixer 18. The front wall 40 includes an opening 56 for mixed product to exit the mixer 18 to the reactor 20 and dispersal plate 23. The rear wall is partially nor semi-cylindrical with a radius substantially corresponding with that of the impellers 32 and blades 34 but providing clearance for the rotation thereof. The mixer 18 has two regions separated by an internal vertical wall 48; a mixing region, shown generally as 52, with the one or more vertical shaft(s) 30 depending on the size and capacity design of the mixer 18. The mixer 18 also has a feeding region, shown generally as 54 that is connected to the disperser plate 23 (FIG. 2A) of the reactor 20. Fluidization is utilized to increase the flowability of the product and to provide a uniform feed to the disperser plate 23 (FIG. 2A) as described further herein. Fluidization may be employed in the mixing region 52 or the feeding region 54 or both. In an embodiment, fluidization is employed at least in the feeding region. Details of the operation of the fluidization are discussed at a later point herein.

In an embodiment, the feed chute 50 is placed vertically over the mixing region 52, though the exact placement is not critical. Between the mixing region 52 and the feeding region 54, the vertical wall 48 is provided to provide the separation of the two regions 40, 42 and to increase the actual residence time of all product and to prevent bypassing, which would result in a direct feed of the recirculated product to the reactor 20. In an embodiment, the vertical wall 48 is fixed to the vertical sidewall 41, and 42 and extends downward from the top 44 toward the bottom 46. An opening, shown generally as 49 beneath the vertical wall 48 permits mixed product to move from mixing region 52 to the feed region 54 and out the opening 56 in the front wall 40 to the reactor 20.

Continuing with FIGS. 3A-4B, in the mixing region 52, the one or more vertical shaft(s) 30 may have one or more impellers 32, each impeller 32 including a plurality of blades 34. In an embodiment, each shaft 30 may include any practical number of impellers 32 arranged as desired along the vertical length of each shaft 30 is envisioned, though in an embodiment 1-4 impellers 32 is anticipated. Each impeller 32 may include a plurality of blades 34 distributed evenly about the circumference of the shaft 30 to ensure the balance of the forces and loads on the blades 34 and shaft 30 when mixing. In an embodiment, any number of blades 34 may be employed for each impeller 32, depending on the dust properties. Though in an embodiment, 2, 3, or 4 blades are expected. In an embodiment, as depicted in FIGS. 3A and 3B, the mixer 18 is shown with a single shaft 30 having two or three impellers 32 each with two blades 34. In another embodiment, as depicted in FIGS. 4A and 4B, the mixer 18 is shown with two shafts 30, each having two impellers 32 each with two blades 34.

In certain embodiments, while the mixer 18 is described as a mixing region shown generally as 52 with the one or more vertical shaft(s) 30 and a feeding region 54 separated by the vertical wall 48, the mixer 18 need not be limited to such a configuration. Indeed, the impellers 32 and blades of one or more vertical shafts 30 may extend under the vertical wall 48 into the feeding region 54. Such a configuration combined with the fluidization described herein aids in the mixing and dispersal of agglomerates. FIGS. 2A and 3A depict examples of this configuration.

In embodiments, a mixer 18 exhibiting a vertical shaft 30 and exhibiting rotating blades 34 provides for convective mixing in all directions, and in particular in a direction parallel to the width of the mixer (e.g., sideways direction) providing improved mixing without pelletization. In addition, the mixer 18 of the described embodiments provides greater shear forces than legacy configurations to break-up the agglomerates. Static blades or baffles 36 in between the impellers 32 and blades 34 enhance these shear forces and eliminate the possibility of forming agglomerates. The static blades 36 contribute further in breaking up the agglomeration by grinding the products lying in between the static blades 36 and rotating blades 34 on the various impellers 32. The static blades 36 provide higher relative velocities between the rotating blade(s) 34 and the products in the mixer 18.

In an embodiment, the static blades 36 are disposed in the horizontal plane in close proximity to one or more impellers 32. The proximity ensures that any agglomerates are subjected to high shear forces to provide improved mixing. It should be appreciated that while the static blades 36 are described as horizontal for an embodiment, such description is merely illustrative. The blades 34, and static blades 36 can be of any variety of configurations as may be known in the art and as described herein.

In an embodiment of the mixer 18, the blade angle with respect to the tangential direction of the rotation of the vertical shaft; can be obtuse or acute. The blade angle denoted (Beta) may vary from the horizontal plane between 10 and 170 degrees, with an obtuse angle of about 120 to about 150 degrees being preferable, though, of course other angles are possible. For example, as depicted in FIGS. 3A, 3B, 3C, 4A, and 4B, the blades 34 are depicted with an obtuse angle of about 150 degrees from the horizontal plane as depicted in FIG. 3C. In another embodiment, blade shape, cross-section, geometry, and the like may be variable, that is, a variable geometry along the radius/length or width of the blade. In an embodiment, the blades may be tapered, twisted, swept, and the like, or with a variable blade angle along the radius of the blade 34. One advantage of the variable angle or twisted blades is that the overall torque on the shaft becomes more uniform or lower especially for larger blades. In addition, loading on the blades is more uniform in the radial direction. In yet another embodiment, the blades 34 of the impeller 32 and/or the static blades may have a sharp leading edge to aid in shearing and break up any agglomeration in the mixing product.

In another embodiment, to further achieve the advantages in mixing resulting from the vertical shaft 30 mixer 18 is to have multiple impellers 32. The rotation of the two neighboring shafts 30 can be in the same direction or the opposite direction. Preferably, but not necessarily, in the same direction depending on the properties of the materials in the mixer 30 and the moisture content thereof. In such an embodiment, an impeller 32 of the first shaft 30 and an impeller 32 of the second shaft 30 are displaced vertically on their respective vertical shafts 30 such that they rotate in differing horizontal planes but the same vertical plane without interference. For example, the impeller 32 that is connected to one vertical shaft 30 may be located vertically in between/adjacent to one or two impellers 32 that are connected to the neighboring shaft 30. In such a case, it would be appreciated that the distance between the two neighboring shafts 30 is just larger than the radius of the impeller plus the shaft radius.

The first vertical shaft 30 is displaced laterally from the second vertical shaft 30 by a sufficient spacing to avoid interference between blades 34 on the first shaft 30 with blades 34 of the second shaft 30 or the second shaft 30 itself. In this embodiment, the relative velocities produced between the passing blades 34 on the opposite rotating impellers 32 and the material in the mixer 18 (e.g., dust) becomes even larger, further increasing the shearing forces. Advantageously the described embodiments facilitate mixing with increasing velocities and shear forces presented to the mixing product than that of the embodiments employing nothing or with static blades 36 positioned between impellers 32 and the rotating blades 34. In yet another embodiment, impellers 32 on the same vertical shaft 30 may counter-rotate, thereby increasing the shearing forces to improve mixing between the products.

Advantageously, in embodiments, the mixer 18 eliminates the need for uniform feeding of the hydrated lime, recirculated dust, and water in the mixer 18. The feeder 17 of hydrated lime and recirculation of legacy mixer configurations has typically been configured the same width as the mixer to ensure uniform distribution of lime, water, and recirculated dust. Similarly, as described previously, in general, a large number of water nozzles were also equally distributed to facilitate added distribution of water. The mixer 18 of the described embodiments employs a feed chute 50 that is a fraction of the overall width of the mixer 18. In an embodiment, the feed chute 50 is configured to be about 20% to 100% of the length of the mixer 18 and preferably in the range of about 40% to 60% depending on the application, recirculation flow rate, moisture content and the like. Furthermore, only a single water nozzle 70 per meter of length is employed for adding water to the hydrated lime. This configuration significantly improves the flexibility of the design of the mixer 18 and eliminates complexities and constraints of legacy configurations. In an embodiment, a single water nozzle 70 per vertical shaft 30 is employed. In another embodiment, the diameter of the impeller 32 is on the order of about 0.85 m to 1.15 m and can vary between 0.5 m and 1.5 meters.

In this way, the required number of water spray nozzles can be reduced by 40% to 100% over legacy configurations while achieving increased moisture content of the product as described herein. In an embodiment, the location of the water nozzles 70 need not be fixed as shown in the two embodiments. In some embodiments, it may be desirable to inject and spray the water directly on the descending recirculating product and avoid spraying on the mixer housing, shaft 30, impeller(s) 32, static blades 36 and the like to avoid deposits and buildups on these surfaces. As an example, as described herein, in the system with a mixer-feeder of the described embodiments, the recirculated dust amount is expected to be reduced by 50% and yet achieves comparable cooling because of the added water and/or moisture content is about doubled. As a result, pressure drop in the reactor and overall power consumption of the system is reduced.

In an embodiment, the vertical shaft 30 and thereby the blades 34 of the mixer are rotated by a drive mechanism 60 and motor 62. The drive mechanism 60 and motor 62 are mounted vertically at or above the top 44 at an axial end of the shaft 30, though other drive schemes and configurations are possible. Advantageously, such a configuration ensures that the motor 62 and drive mechanism 60 are isolated from the harsh environment of the mixer 18. In an embodiment, a single motor 62 may be employed with a drive mechanism 60 configured to drive multiple vertical shafts 30. In another embodiment, a motor 62 and drive mechanism per vertical shaft may be employed. In an embodiment, one or more vertical shafts 30 of the mixer 18 may be operated at differing speeds in either direction. In an embodiment, the mixer 18 might include a constant speed integral gear-motor assembly for the motor 62 and drive mechanism 60. In an embodiment, the motor 62 and drive mechanism 60 are operable to operate at a substantially constant speed. However, in another embodiment, the mixer might employ a variable speed drive control to save energy by running at higher or lower speeds when possible. In another embodiment, the motor 62 and drive mechanism 60 may provide for a self-cleaning operational mode which is facilitated by the described vertical shaft 30 and impeller 32 mixer 18 via operations at dry recirculating through the mixer 18 at high speed for a selected duration. In an embodiment, a duration of 2-3 hours is sufficient to provide for cleaning. For example, in an embodiment, it is possible to run the mixer "dry" at higher rpm, (e.g., 2-3 times of that at the normal operation) approximately 150-240 rpm without exceeding the torque or the maximum power ratings of the gear-motor 62 and/or drive mechanism 60. It should be appreciated legacy mixers such as the paddle-type or the rotating disk type, cannot readily be operated with such a self-cleaning feature. As a result, in embodiments, operating expenses are reduced and operational availability is improved over existing mixers.

Certain embodiments of the vertical-shaft mixer 10 provide numerous mechanical advantages, which increase mixer longevity. In particular, the vertical shaft 30 reduces loads on bearings and seals and reduce mixer scale in all directions. Embodiments also significantly reduce size and weight by approximately 10 to 50%, particularly in the width, and avoid immersing seals and bearings in products being mixed.

In yet another embodiment, the mixer 18 includes an air/gas/flue gas distributor shown generally as 64 with an introduction port 65 in the bottom 46 of the mixer 18 configured to aid in fluidization of the product in the mixer 18. In an embodiment, the bottom 46 of the housing 19 includes a manifold or chamber 66 and distribution structure 67 for distributing the air/gas/flue gas, preferably in a uniform flow into at least the feeding region 54. The additional air/gas/flue gas provides for increased flowability of the products and directs the mixed end product to the reactor 20 uniformly along the width of the feeding side of the mixer 18 and the duct to the reactor 20 and dispersing plate 23. In an embodiment, the distribution structure 67 could be a plurality of tubes with orifices. Another embodiment for employing fluidization air is a distribution structure 67 formed of an air-permeable fabric or permeable cloth covering the bottom that distributes air/gas/flue gas into the feeding region 54 and/or mixing region 52. In an embodiment, the bottom 46 is configured in two parts, one under the mixing region 52, and another under the feeding region 54. In an embodiment, the portion of the bottom 46 under the feeding region 54 is an air distributor 64 including the introduction port 65, manifold or chamber 66 providing for the fluidization air as described herein. The portion of the bottom 46 under the mixing region 52 can be either a solid wall or an air distributor 65 as described herein if the fluidization is also used in the mixing region 52. The use of the fluidization under the mixing region 52 is an option that may be employed depending on the dust properties, moisture content, and the like. In FIGS. 3A, 3B, 4A, and 4B, an air/gas/flue gas distributor 64 provides fluidization in both the mixing region 52 and the feeding region 54.

Advantageously, due to the improved functionality of the mixer 18, a wide variety of hydrators 17 may readily be interfaced with the mixer 18. In an embodiment, the hydrator 17 is connected directly, without the need for uniformly distributing hydrated lime along the width of the mixer 18, because of the effective sidewise mixing of the vertical shafts 30. That facilitates connecting the described mixer 18 to a larger variety of hydrators, with different connection geometries, without being subject to the described constraints of the existing configurations on mixing and moisture content.

The mixer 18 of the described embodiments improves the mixing of recirculated product, fresh hydrated lime, and water to a homogenously mixed product. Moreover, the mixer 18 of embodiments eliminates legacy requirements for uniform feeding of products and also reduce or eliminate the risk of creating build-ups in the mixer 18, creating pellets in the mixed product and "blinding" the fresh hydrated lime. As will be appreciated, eliminating the need for a recirculation feeder that must have the same width as the mixer 18 (which might be as large as a 4-meter long rotating shaft, with high torque, high bending moments and fatigue) reduces or eliminates system design and operational constraints.

Figure 5:
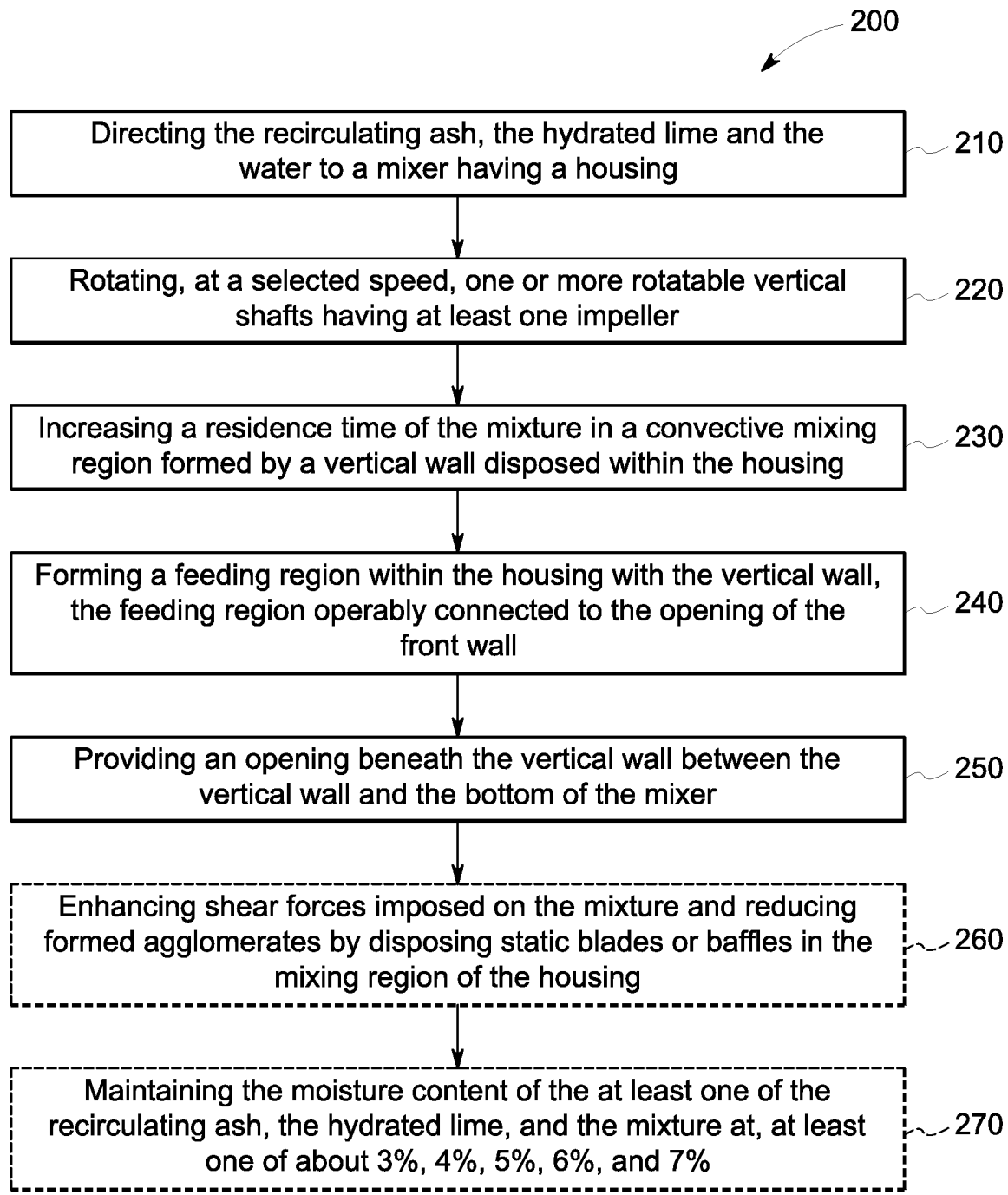
FIG. 5 is a flow chart illustration of a method of mixing recirculating ash from solid fuel combustion with hydrated lime and water and to feed the mixture into a desulfurization reactor in accordance with an embodiment.

FIG. 5 depicts a method 200 of mixing recirculating ash from solid fuel combustion with hydrated lime and water and to feed the mixture into a desulfurization reactor in accordance with an embodiment. The method 200 initiates with directing the recirculating ash, the hydrated lime and the water to a mixer 18 having housing 19 via a feed chute 50, the housing 19 having a front wall 40, two outer vertical side walls 41, a rear wall 42, a top 44 and a bottom 46, and the front wall 40 includes an opening 56 for mixed product to exit the mixer 18 as depicted at process step 210. As depicted at process step 220, the method 200 includes rotating, at a selected speed, one or more rotatable vertical shafts 30 having at least one impeller 32, the at least one impeller 32 including a first plurality of blades 34 disposed on the vertical shaft 30 in the same horizontal plane, the first plurality of blades 34 of the at least one impeller 32 distributed equidistantly about the circumference of the vertical shaft 30, the blades 34 having a shear contact with the mixture to add shear forces and avoid agglomeration and pellet formation in the mixture when exhibiting a selected moisture content. At process step 230, the method 200 also includes increasing a residence time of the mixture in a mixing region 52 formed by a vertical wall 48 disposed within the housing 19, the mixing region 52 including the one or more vertical shaft(s) 30. At process step 240, the method 200 continues with forming a feeding region 54 within the housing 19 with the vertical wall 48, the feeding region 54 operably connected to the opening 56 of the front wall 40. Providing an opening beneath the vertical wall 48 between the vertical wall 48 and the bottom 46 of the mixer 18 as depicted at process step 250. Once again, it will be appreciated that the blades 34, impellers 32 may include portions that extend from the mixing region 52 as described herein to the feeding region 54. The method 200 may optionally include enhancing shear forces imposed on the mixture and reducing formed agglomerates by employing static blades or baffles disposed in the mixing region of the housing as depicted at process step 260. The method 200 continues with optionally maintaining the moisture content of the recirculating ash, the hydrated lime, and/or the mixture at least one of about 3%, or 4%, or 5%, or 6%, and 7%, as depicted at process step 270.

It should be appreciated that while various steps of the method 200 are depicted in a particular order, they need not be, and are described in such order merely to illustrate the examples of the embodiments. Some steps may of discussion, some steps may readily be conducted in a different order. In addition to operational savings, the power generation system of certain described embodiments provides for capital cost savings on new plant or mixer design and constructions. In particular, in embodiments, it is possible to design/plan equipment for simpler mixer design constraints while providing for higher moisture content products. Furthermore, embodiments provide for capital and recurring cost savings on existing retrofitted plant or flue gas treatment systems. In particular, it is possible to modify existing equipment for lower mixing and desulphurization costs.

In an embodiment, a method for mixing recirculating ash from solid fuel combustion with hydrated lime and water and to feed the mixture into a desulfurization reactor is provided. The method includes directing the recirculating ash, the hydrated lime and the water to a mixer having housing via a feed chute, the housing having a front wall, two outer vertical sidewalls, a rear wall, a top and a bottom, and the front wall includes an opening for mixed product to exit the mixer, rotating, at a first selected speed, in a first direction, a first rotatable vertical shaft having at least one an impeller, the at least one impeller including a first plurality of blades disposed on the first vertical shaft in the same horizontal plane, the first plurality of blades of the at least one impeller distributed about the circumference of the first vertical shaft, the blades having a shear contact with the mixture to add shear forces and avoid agglomeration and pellet formation in the mixture when exhibiting a selected moisture content, and increasing a residence time of the mixture in a mixing region formed by a vertical wall disposed within the housing, the mixing region including the one or more vertical shaft(s). The method also includes forming a feeding region within the housing with the vertical wall, the feeding region operably connected to the opening of the front wall, and providing an opening beneath the vertical wall between the vertical wall and the bottom of the mixer, fluidizing the mixture with a fluidization mechanism in at least the feeding region to increase flowability of the mixture, the fluidizing including directing gases or air into the mixture from the bottom of the housing, and directing the mixture to the opening.

In addition to one or more of the features described above, or as an alternative, further embodiments of the method may include forming the rear wall at least partially semi-cylindrical with a radius substantially corresponding with that of the impellers and blades but providing clearance for the rotation thereof.

In addition to one or more of the features described above, or as an alternative, further embodiments of the method may include positioning the feed chute vertically over the mixing region, wherein the feed chute is a fraction of the overall length of the mixer.

In addition to one or more of the features described above, or as an alternative, further embodiments of the method may include disposing another impeller on the first vertical shaft, wherein another impeller includes a second plurality of blades distributed evenly about the circumference of the first vertical shaft.

In addition to one or more of the features described above, or as an alternative, further embodiments of the method may include enhancing shear forces imposed on the mixture and reducing formed agglomerates by employing static blades or baffles disposed in the mixing region of the housing.

In addition to one or more of the features described above, or as an alternative, further embodiments of the method may include adding water via a water nozzle disposed in the mixing region, to at least one of the recirculating ash, the hydrated lime, and the mixture.

In addition to one or more of the features described above, or as an alternative, further embodiments of the method may include employing a single water nozzle per meter of length of the mixer.

In addition to one or more of the features described above, or as an alternative, further embodiments of the method may include that the selected moisture content of the at least one of the recirculating ash, the hydrated lime, and the mixture is at least one of about 3%, 4%, 5%, 6%, and 7%.

In addition to one or more of the features described above, or as an alternative, further embodiments of the method may include fluidizing the mixture in the mixing region with the fluidization mechanism to increase the flowability of the mixture, the fluidizing including directing gases or air into the product from the bottom of the housing.

In addition to one or more of the features described above, or as an alternative, further embodiments of the method may include controlling a rotation speed of the first vertical shaft based at least in part on at least one of an operating mode of the mixer, the recirculating ash, the hydrated lime, the mixture at, and a moisture content of any of the foregoing.

In addition to one or more of the features described above, or as an alternative, further embodiments of the method may include rotating, at a second selected speed in a second direction, a second rotatable vertical shaft having at least one impeller, the at least one impeller including a second plurality of blades disposed on the second vertical shaft in the same horizontal plane, the second plurality of blades of the at least one impeller distributed equidistantly about the circumference of the second vertical shaft, the blades having a shear contact with the mixture to add shear forces and avoid agglomeration and pellet formation in the mixture when exhibiting a selected moisture content.

In addition to one or more of the features described above, or as an alternative, further embodiments of the method may include at least one of the first selected speed is different than the second selected speed, and the first direction is opposite the second direction.

In addition to one or more of the features described above, or as an alternative, further embodiments of the method may include that the first vertical shaft is displaced laterally from the second vertical shaft by a sufficient to avoid interference between blades on the first shaft with blades of the second shaft or the second shaft.

In addition to one or more of the features described above, or as an alternative, further embodiments of the method may include that an impeller of the first shaft and an impeller of the second shaft is displaced vertically on their respective vertical shafts such that they rotate in differing horizontal planes but the same vertical plane without interference.

In addition to one or more of the features described above, or as an alternative, further embodiments of the method may include that the at least one impeller extends beyond the vertical wall to the feeding region.

Also described herein in another embodiment is a mixer for recirculating ash from solid fuel combustion with hydrated lime and water and to feed the mixture into a desulfurization reactor. The mixer includes a housing including: a front wall, two outer vertical sidewalls, a rear wall, a top, and a bottom, and a feed chute configured for the entry and addition of product to the mixer, and the front wall includes an opening for mixed product to exit the mixer. The mixer also includes one or more rotatable vertical shafts having at least one an impeller, the at least one impeller including a first plurality of blades disposed on the vertical shaft in the same horizontal plane, the first plurality of blades of the at least one impeller distributed equidistantly about the circumference of the vertical shaft, the blades having a shear contact with the mixture to add shear forces and avoid agglomeration and pellet formation in the mixture when exhibiting a selected moisture content, and an internal vertical wall disposed within the housing forming a mixing region with the one or more vertical shaft(s) and a feeding region that is operably connected to the opening of the front wall, the internal vertical wall operable to increase a residence time of the mixture in the mixing region and to prevent bypassing, the internal vertical wall including an opening, beneath the internal vertical wall between the internal vertical wall and the bottom of the mixer. The mixer also includes a fluidization mechanism in at least the feeding region to increase flowability of the mixture, the fluidizing mechanism directing gases or air into the mixture from the bottom of the housing.

In addition to one or more of the features described above, or as an alternative, further embodiments of the mixer may include that the rear wall is at least partially semi-cylindrical with a radius substantially corresponding with that of the impellers and blades but providing clearance for the rotation thereof.

In addition to one or more of the features described above, or as an alternative, further embodiments of the mixer may include that the feed chute is positioned vertically over the mixing region.

In addition to one or more of the features described above, or as an alternative, further embodiments of the mixer may include that the feed chute is a fraction of the overall width of the mixer.

In addition to one or more of the features described above, or as an alternative, further embodiments of the mixer may include another impeller disposed on the one or more vertical shafts, wherein another impeller includes a second plurality of blades distributed evenly about the circumference of the vertical shaft.

In addition to one or more of the features described above, or as an alternative, further embodiments of the mixer may include that the second plurality of blades includes a different number of blades than the first plurality of blades.

In addition to one or more of the features described above, or as an alternative, further embodiments of the mixer may include that the at least one impeller provides for convective mixing in all directions, and in particular in a sideways direction providing improved mixing without pelletization.

In addition to one or more of the features described above, or as an alternative, further embodiments of the mixer may include static blades or baffles disposed in the mixing region of the housing the static blades operable to enhance shear forces imposed on the mixture and reduce forming agglomerates.

In addition to one or more of the features described above, or as an alternative, further embodiments of the mixer may include that the internal vertical wall is fixed to at least one of the top or one of the vertical sidewalls and extends downward from the top toward the bottom of the housing, wherein the opening permits the mixture to move from mixing region to the feed region and out the opening in the front wall.

In addition to one or more of the features described above, or as an alternative, further embodiments of the mixer may include a water nozzle operable to add water to at least one of the recirculating ash, the hydrated lime, and the mixture.

In addition to one or more of the features described above, or as an alternative, further embodiments of the mixer may include that the mixer employs a single water nozzle per meter of length operable to add water to at least one of the recirculating ash, the hydrated lime, and the mixture.

In addition to one or more of the features described above, or as an alternative, further embodiments of the mixer may include that the water added to the at least one of the recirculating ash, the hydrated lime, and the mixture is sufficient to maintain the moisture content of the mixture at, at least one of about 3%, 4%, 5%, 6%, and 7%.

In addition to one or more of the features described above, or as an alternative, further embodiments of the mixer may include a fluidization mechanism disposed at the bottom of the housing, the fluidization mechanism operable to blow air or gas into the mixture to increase flowability of the mixture in the mixing region.

In addition to one or more of the features described above, or as an alternative, further embodiments of the mixer may include controlling a rotation speed of the first vertical shaft based at least in part on at least one of an operating mode of the mixer, the recirculating ash, the hydrated lime, the mixture at, and a moisture content of any of the foregoing.

In addition to one or more of the features described above, or as an alternative, further embodiments of the mixer may include a second rotatable vertical shaft rotating, at a second selected speed in a second direction, having at least one impeller, the at least one impeller including a second plurality of blades disposed on the second vertical shaft in the same horizontal plane, the second plurality of blades of the at least one impeller distributed equidistantly about the circumference of the second vertical shaft, the blades having a shear contact with the mixture to add shear forces and avoid agglomeration and pellet formation in the mixture when exhibiting a selected moisture content.

In addition to one or more of the features described above, or as an alternative, further embodiments of the mixer may include that at least one of the first selected speed is different than the second selected speed and the first direction is opposite the second direction.

In addition to one or more of the features described above, or as an alternative, further embodiments of the mixer may include that the first vertical shaft is displaced laterally from the second vertical shaft by a sufficient to avoid interference between blades on the first shaft with blades of the second shaft or the second shaft.

In addition to one or more of the features described above, or as an alternative, further embodiments of the mixer may include that an impeller of the first shaft and an impeller of the second shaft are displaced vertically on their respective vertical shafts such that they rotate in differing horizontal planes but the same vertical plane without interference.

In addition to one or more of the features described above, or as an alternative, further embodiments of the mixer may include that the at least one impeller extends beyond the internal vertical wall to the feeding region.

Also described herein in yet another embodiment is a system for treating flue gases and mixing recirculating ash from solid fuel combustion with hydrated lime and water and to feed the mixture into a desulfurization reactor. The system includes a plant system including a combustion system that combusts fuel to form flue gases and ash, a flue gas treatment system operable to provide a semi-dry flue gas desulphurization of heated acid-rich flue gases, the flue gas treatment system including, a reactor for reacting acidic flue gasses with hydrated lime under humidified conditions, and a particulate collection device operable to separate gaseous pollutants from particulate matter yielding captured dust while flue gases are directed to a stack for disposal. The system also includes a mixer for recirculating ash from solid fuel combustion with hydrated lime and water and to feed the mixture into a desulfurization reactor. The mixer includes a housing including a front wall, two outer vertical side walls, a rear wall, a top and a bottom, the top includes a feed chute configured for the entry and addition of product to the mixer, and the front wall includes an opening for mixed product to exit the mixer, one or more rotatable vertical shafts having at least one an impeller, the at least one impeller including a first plurality of blades disposed on the vertical shaft in the same horizontal plane, the first plurality of blades of the at least one impeller distributed equidistantly about the circumference of the vertical shaft, the blades having a shear contact with the mixture to add shear forces and avoid agglomeration and pellet formation in the mixture when exhibiting a selected moisture content, and a vertical wall disposed within the housing forming a mixing region with the one or more vertical shaft(s) and a feeding region that is operably connected to the opening of the front wall, the internal vertical wall operable to increase a residence time of the mixture in the mixing region and to prevent bypassing, the vertical wall including an opening, beneath the vertical wall between the vertical wall and the bottom of the mixer. Finally, the system includes a fluidization mechanism in at least the feeding region to increase flowability of the mixture, the fluidizing mechanism directing gases or air into the mixture from the bottom of the housing.

Finally, it is also to be understood that the system 10 and control unit 150 may include the necessary electronics, software, memory, storage, databases, firmware, logic/state machines, microprocessors, communication links, displays or other visual or audio user interfaces, printing devices, and any other input/output interfaces to perform the functions described herein and/or to achieve the results described herein. For example, as previously mentioned, the system may include at least one processor and system memory/data storage structures, which may include random access memory (RAM) and read-only memory (ROM). The at least one processor of the system 10 may include one or more conventional microprocessors and one or more supplementary co-processors such as math co-processors or the like. The data storage structures discussed herein may include an appropriate combination of magnetic, optical and/or semiconductor memory, and may include, for example, RAM, ROM, flash drive, an optical disc such as a compact disc and/or a hard disk or drive.

Additionally, a software application that adapts the controller to perform the methods or steps of the method disclosed herein may be read into a main memory of the at least one processor from a computer-readable medium. Thus, embodiments of the present invention may perform the methods disclosed herein in real-time. The term "computer-readable medium," as used herein, refers to any medium that provides or participates in providing instructions to the at least one processor of the system (or any other processor of a device described herein) for execution. Such a medium may take many forms, including but not limited to, non-volatile media and volatile media.

As used herein, an element or step recited in the singular and proceeded with the word "a" or "an" should be understood as not excluding plural of said elements or steps, unless such exclusion is explicitly stated. Furthermore, references to "one embodiment" of the described embodiments are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

Additionally, while the dimensions and types of materials described herein are intended to define the parameters associated with the described embodiments, they are by no means limiting and are exemplary embodiments. Many other embodiments will be apparent to those of skill in the art upon reviewing the above description. The scope of the invention should, therefore, be determined with reference to the appended claims. Such description may include other examples that occur to one of ordinary skill in the art and such other examples are intended to be within the scope of the claims if they have structural elements that do not differ from the literal language of the claims, or if they include equivalent structural elements with insubstantial differences from the literal languages of the claim. In the appended claims, the terms "including" and "in which" are used as the plain-English equivalents of the respective terms "comprising" and "wherein." Moreover, in the following claims, terms such as "first," "second," "third," "upper," "lower," "bottom," "top," etc. are used merely as labels, and are not intended to impose numerical or positional requirements on their objects. Further, the limitations of the following claims are not written in means-plus-function format are not intended to be interpreted as such, unless and until such claim limitations expressly use the phrase "means for" followed by a statement of function void of further structure.

What is claimed is:

1. A mixer for recirculating ash from solid fuel combustion with hydrated lime and water and to feed a mixture thereof into a desulfurization reactor, the mixer comprising:
    a housing comprising:
        a front wall, two outer vertical side walls, a rear wall, a top, and a bottom,
        a feed chute configured for the entry and addition of product to the mixer, and the front wall includes an opening for the mixture to exit the mixer,
    a first rotatable vertical shaft having a first impeller, the first impeller comprising a first plurality of blades disposed on the vertical shaft in the same horizontal plane, the first plurality of blades of the first impeller distributed equidistantly about the circumference of the vertical shaft, the first plurality of blades having a shear contact with the mixture to add shear forces and avoid agglomeration and pellet formation in the mixture when exhibiting a selected moisture content;
    an internal vertical wall disposed within the housing forming a mixing region with the first rotatable vertical shaft and a feeding region that is operably connected to the opening of the front wall, the internal vertical wall operable to increase a residence time of the mixture in the mixing region and to prevent bypassing, the internal vertical wall including an opening beneath the internal vertical wall between the internal vertical wall and the bottom of the mixer; and
    a fluidization mechanism operable to increase flowability of the mixture, in at least the feeding region by directing gases or air into the mixture from the bottom of the housing.

2. The mixer as recited in claim 1, wherein the feed chute is positioned vertically over the mixing region.

3. The mixer as recited in claim 1, further comprising a second impeller disposed on the first vertical shaft, wherein the second impeller includes a second plurality of blades distributed evenly about the circumference of the first vertical shaft.

4. The mixer as recited in claim 1, further comprising static blades or baffles disposed in the mixing region of the housing, the static blades or baffles operable to enhance shear forces imposed on the mixture and reduce forming agglomerates.

5. The mixer as recited in claim 1, wherein the internal vertical wall is fixed to at least one of the top or one of the vertical sidewalls and extends downward from the top toward the bottom of the housing, wherein the opening permits the mixture to move from the mixing region to the feed region and out the opening in the front wall.

6. The mixer as recited in claim 1, wherein the selected moisture content of the mixture is in a range of about 3% to about 7%.

7. The mixer as recited in claim 1, further comprising the fluidization mechanism operable to blow air or a gas into the mixture to increase flowability of the mixture in the mixing region.

8. The mixer as recited in claim 1, further comprising a second rotatable vertical shaft rotating at a second selected speed in a second direction, having a first impeller, the first impeller comprising a first plurality of blades disposed on the second vertical shaft in the same horizontal plane, the first plurality of blades of the at least one impeller distributed equidistantly about the circumference of the second vertical shaft, the blades having a shear contact with the mixture to add shear forces and avoid agglomeration and pellet formation in the mixture when exhibiting a selected moisture content.

9. The mixer as recited in claim 1, wherein the first impeller extends beyond the internal vertical wall to the feeding region.

10. The mixer as recited in claim 1, wherein the at least one of the first plurality of blades exhibits a variable angle or geometry.

11. A method for mixing recirculating ash from solid fuel combustion with hydrated lime and water and to feed a mixture thereof into a desulfurization reactor, the method comprising:
    directing the recirculating ash, the hydrated lime, and the water to a mixer having a housing via a feed chute, the housing having a front wall, two outer vertical sidewalls, a rear wall, a top, and a bottom, and the front wall includes an opening for the mixture to exit the mixer;
    rotating, at a first selected speed, in a first direction, a first rotatable vertical shaft having a first impeller, the first impeller comprising a first plurality of blades disposed on the first vertical shaft in the same horizontal plane, the first plurality of blades of the first impeller distributed about the circumference of the first vertical shaft, the blades having a shear contact with the mixture to add shear forces and avoid agglomeration and pellet formation in the mixture when exhibiting a selected moisture content;
    increasing a residence time of the mixture in a mixing region formed by a vertical wall disposed within the housing, the mixing region including the first rotatable vertical shaft(s);
    forming a feeding region within the housing with the vertical wall, the feeding region operably connected to the opening of the front wall, and providing an opening beneath the vertical wall between the vertical wall and the bottom of the mixer;
    fluidizing the mixture with a fluidization mechanism in at least the feeding region to increase flowability of the mixture, the fluidizing including directing gases or air into the mixture from the bottom of the housing; and
    directing the mixture to the opening.

12. The method as recited in claim 11, further comprising positioning the feed chute vertically over the mixing region, wherein the feed chute is a fraction of the overall length of the mixer.

13. The method as recited in claim 11, further comprising disposing a second impeller on the first vertical shaft, wherein the second impeller includes a second plurality of blades distributed evenly about the circumference of the first vertical shaft.

14. The method as recited in claim 11, further including enhancing shear forces imposed on the mixture and reducing formed agglomerates by employing static blades or baffles disposed in the mixing region of the housing.

15. The method as recited in claim 11, further comprising adding water via a water nozzle disposed in the mixing region, to the at least one of the recirculating ash, the hydrated lime, and the mixture.

16. The method as recited in claim 11, wherein the selected moisture content of the mixture is within a range of about 3% to about 7%.

17. The method as recited in claim 11, further comprising fluidizing the mixture with the fluidization mechanism in the mixing, the fluidizing includes directing gases or air into the mixture from the bottom of the housing.

18. The method as recited in claim 11, further comprising controlling a rotation speed of the first vertical shaft based at least in part on at least one of an operating mode of the mixer, the recirculating ash, the hydrated lime, the mixture at, and a moisture content of any of the foregoing.

19. The method as recited in claim 11, further comprising:
rotating, at a second selected speed in a second direction, a second rotatable vertical shaft having a first impeller, the first impeller comprising a first plurality of blades disposed on the second vertical shaft in the same horizontal plane, the first plurality of blades of the first impeller distributed equidistantly about the circumference of the second vertical shaft, the blades having a shear contact with the mixture to add shear forces and avoid agglomeration and pellet formation in the mixture when exhibiting a selected moisture content.

20. The method as recited in claim 11, wherein the at least one impeller extends beyond the vertical wall to the feeding region.

21. A system for treating flue gases and mixing recirculating ash from solid fuel combustion with hydrated lime and water and to feed the mixture into a desulfurization reactor, the system comprising:
a plant system including a boiler having a combustion system that combusts fuel to form flue gases and ash;
a flue gas treatment system operable to provide a semi-dry flue gas desulphurization of heated acid-rich flue gases, the flue gas treatment system including;
a reactor for reacting acidic flue gasses with hydrated lime under humidified conditions,
a particulate collector operable to separate gaseous pollutants from particulate matter yielding captured dust while flue gases are directed to a stack for disposal, and
a mixer for recirculating ash from solid fuel combustion with hydrated lime and water and to feed the mixture into a desulfurization reactor, the mixer comprising:
a housing including a front wall, two outer vertical sidewalls, a rear wall, a top, and a bottom,
wherein, the top includes a feed chute configured for the entry and addition of product to the mixer, and the front wall includes an opening for mixed product to exit the mixer,
one or more rotatable vertical shafts having at least one an impeller, the at least one impeller comprising a first plurality of blades disposed on the vertical shaft in the same horizontal plane, the first plurality of blades of the at least one impeller distributed equidistantly about the circumference of the vertical shaft, the blades having a shear contact with the mixture to add shear forces and avoid agglomeration and pellet formation in the mixture when exhibiting a selected moisture content,
a vertical wall disposed within the housing forming a mixing region with the one or more vertical shaft(s) and a feeding region that is operably connected to the opening of the front wall, the internal vertical wall operable to increase a residence time of the mixture in the mixing region and to prevent bypassing, the vertical wall including an opening, beneath the vertical wall between the vertical wall and the bottom of the mixer; and
a fluidization mechanism in at least the feeding region to increase flowability of the mixture, the fluidizing mechanism directing gases or air into the mixture from the bottom of the housing.

* * * * *